United States Patent
Asano

(10) Patent No.: US 7,336,286 B2
(45) Date of Patent: Feb. 26, 2008

(54) METHOD OF AND AN APPARATUS FOR PROCESSING IMAGES

(75) Inventor: Masanari Asano, Miyagi (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 896 days.

(21) Appl. No.: 09/899,157

(22) Filed: Jul. 6, 2001

(65) Prior Publication Data

US 2002/0025083 A1 Feb. 28, 2002

(30) Foreign Application Priority Data

Aug. 15, 2000 (JP) ............................. 2000-246102

(51) Int. Cl.
*G09G 5/00* (2006.01)

(52) U.S. Cl. .................... 345/629; 345/632; 345/634; 345/638

(58) Field of Classification Search ............... 386/107; 345/581, 569, 572, 629, 213, 660, 632, 634, 345/638; 348/581, 589, 569, 564; 358/1.12; 382/300

See application file for complete search history.

(56) References Cited

U.S. PATENT DOCUMENTS

| | | | |
|---|---|---|---|
| 5,200,739 A | | 4/1993 | Eland |
| 5,489,947 A | * | 2/1996 | Cooper .................... 348/589 |
| 5,534,942 A | * | 7/1996 | Beyers et al. ............... 348/569 |
| 5,926,174 A | * | 7/1999 | Shibamiya et al. ......... 345/213 |
| 5,982,981 A | * | 11/1999 | Satoh .......................... 386/107 |
| 6,215,467 B1 | * | 4/2001 | Suga et al. ................. 345/660 |
| 6,351,291 B1 | * | 2/2002 | Asano ......................... 348/564 |
| 6,351,292 B1 | * | 2/2002 | Knox et al. ................. 348/569 |
| 6,664,970 B1 | * | 12/2003 | Matsushita .................. 345/581 |
| 6,897,902 B1 | * | 5/2005 | Van Asma .................. 348/458 |

\* cited by examiner

*Primary Examiner*—Kee M. Tung
*Assistant Examiner*—Hau H Nguyen
(74) *Attorney, Agent, or Firm*—Arent Fox, LLP

(57) ABSTRACT

In an image processing apparatus to conduct an on-screen display operation, the bus band of an image memory is minimized. The apparatus includes an image memory including a first memory area to store a first image data group of a first image for a background and a second memory area for storing a second image data group of a second image for an on-screen display, a display buffer memory for storing, in a format to be displayed on a display screen, the first image and the second image read from the image memory; and a control section for controlling accesses in the image memory and the display buffer memory, for reading the first image data group from the first memory area and writing the first image data group in the display buffer memory, and for reading the second image data group from the second memory area and writing the second image data group in a specified area of the display buffer memory. The control section includes a data expansion control section capable of increasing a data amount of the second image data group read from the image memory, according to the second image data group.

19 Claims, 8 Drawing Sheets

METHOD OF AND AN APPARATUS FOR PROCESSING IMAGES

This application is based on Japanese Patent Application 2000-246102, filed on Aug. 15, 2000, all the content of which is incorporated herein by reference.

BACKGROUND OF THE INVENTION

1. Field of the Invention

The present invention relates to an image processing apparatus to conduct an on-screen display operation in which an image is superimposed on an image in a screen.

2. Description of the Related Art

Image pickup devices such as a digital still camera and a digital movie camera including a solid-state image pickup device, for example, a charge-coupled device (CCD) have been put to business uses and other general uses. In such an image pickup device, a technique called "on-screen display (OSD)" is employed. That is, while displaying image data sent from an image data source or the like as a main screen image on a screen, another secondary information, for example, character information is displayed in a minimized size on the same screen. Using an image processing apparatus having the OSD function, an image of nature, character information, and/or a mobile picture can be freely displayed.

However, the image processing apparatus having the OSD function is attended with a problem. That is, OSD data is frequently read from an memory and hence occupies most of a bus band of an image memory.

Since the memory bus band is limited, the OSD data and the number of screen images to be display are also restricted. This leads to reduction of frames in the displayed picture and deterioration of display resolution, and hence picture quality is deteriorated. When frequency of OSD data accesses becomes greater, there possibly occurs a case in which the band necessary to communicate data between the memory and a central processing unit (CPU) cannot be sufficiently reserved.

To simply solve the problem, it is only necessary to increase an access speed of the memory. However, since power consumption of the memory increases in this case, a problem of "electromagnetic interference (EMI)" takes place.

Therefore, to smoothly conduct image processing, it is necessary to reduce the number of OSD data accesses.

SUMMARY OF THE INVENTION

It is therefore an object of the present invention to reduce the bus band of an image memory in an image processing apparatus capable of conducting an on-screen display (OSD) operation.

According to one aspect of the present invention, there is provided an image processing apparatus comprising an image memory including a first memory area to store a first image data group of a first image for a background and a second memory area for storing a second image data group of a second image for an on-screen display, a display buffer memory for storing the first image and the second image read from the image memory, in a format to be displayed on a display screen, and a control section for controlling accesses in the image memory and the display buffer memory, for reading the first image data group from the first memory area and writing the first image data group in the display buffer memory, and for reading the second image data group from the second memory area and writing the second image data group in a specified area of the display buffer memory. The control section includes a data expansion control section capable of increasing a data amount of the second image data group read from the image memory, according to the second image data group.

Moreover, according to one aspect of the present invention, there is provided an image processing method comprising the steps of (a) storing, in an image memory, a first image data group for a background and a second image data group for an on-screen display; (b) reading the first image data group for a background and the second image data group for an on-screen display from the image memory and increasing a data amount of the second image data group; and (c) displaying, on a display screen, the first image data group and a second image data group of which the data amount is increased.

According to the present invention, it is possible to minimize the bus band of the image memory of the image processing apparatus capable of conducting OSD, and hence picture quality of the display screen can be increased.

BRIEF DESCRIPTION OF THE DRAWINGS

The objects and features of the present invention will become more apparent from the consideration of the following detailed description taken in conjunction with the accompanying drawings in which.

DETAILED DESCRIPTION OF THE EMBODIMENTS

Figure 1:
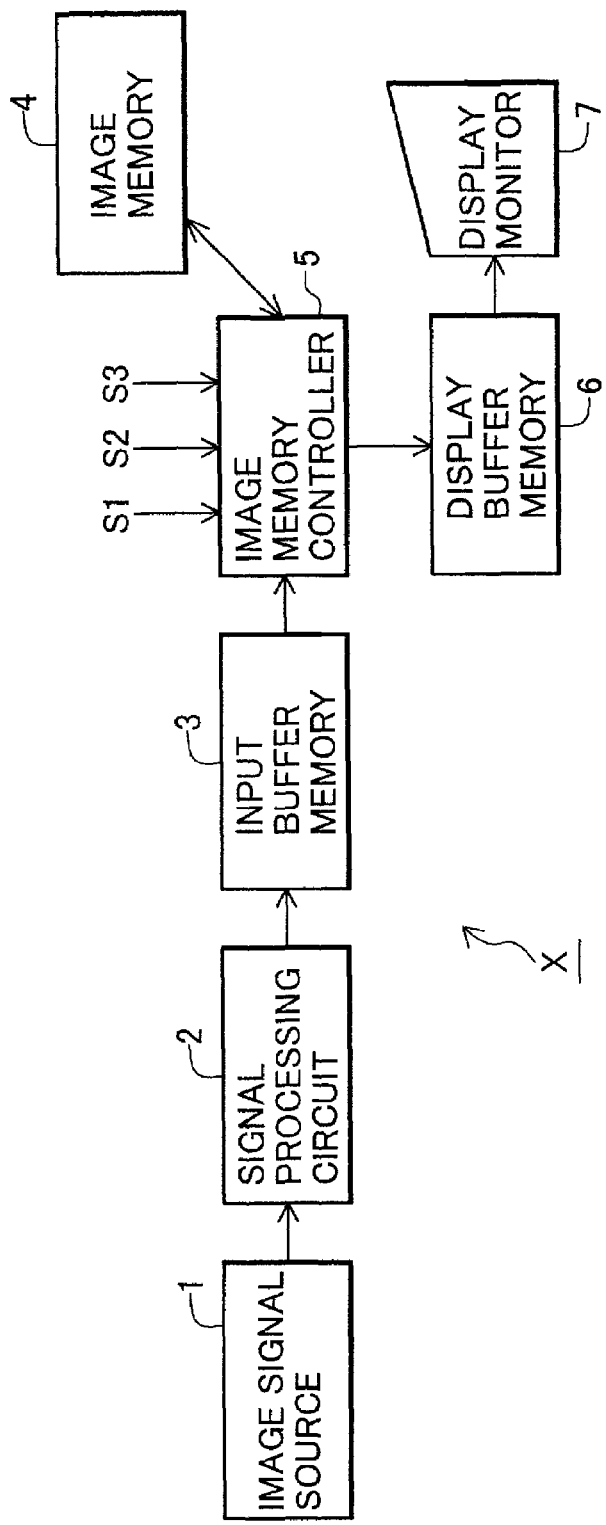
FIG. 1 is a block diagram showing constitution of an image processing apparatus in a first embodiment of the present invention.
Figure 2:
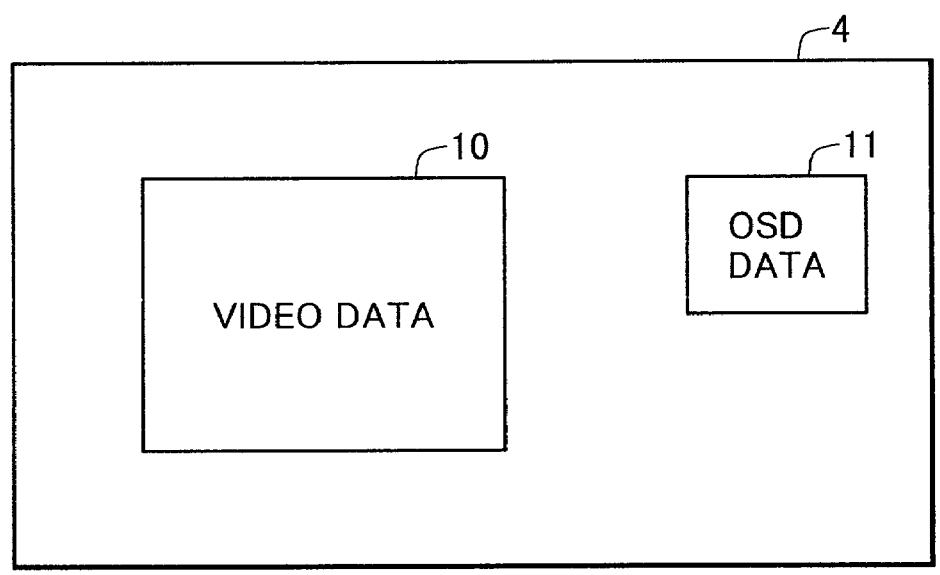
FIG. 2 is a diagram showing an image memory in a storage of the image processing apparatus of the first embodiment.
Figure 3:
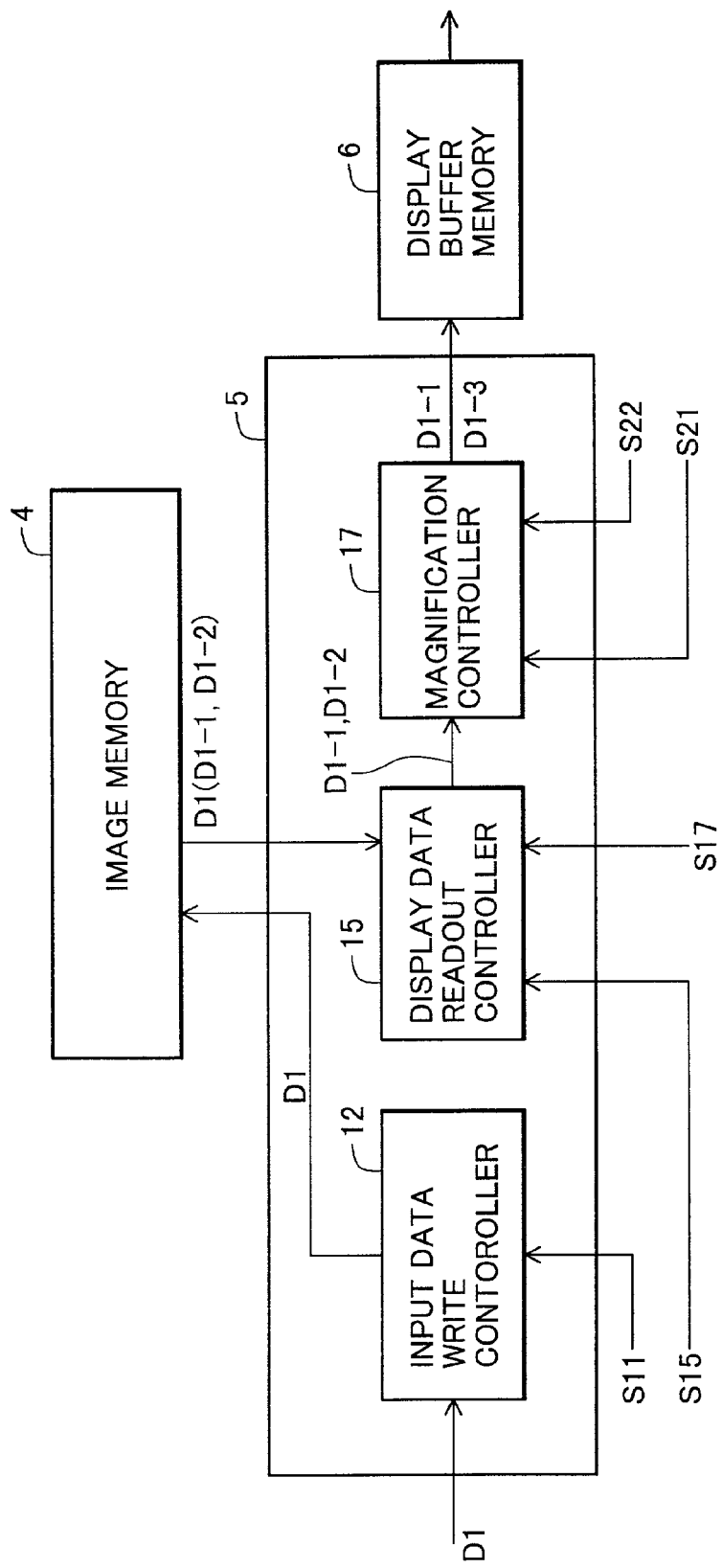
FIG. 3 is a block diagram showing constitution of an image memory controller of the image processing apparatus in the first embodiment

Referring now to FIGS. 1 to 3, description will be given of an image processing apparatus in an embodiment.

FIG. 1 shows a configuration of an image processing apparatus X of the embodiment in a block diagram.

FIG. 2 shows a layout of an image memory in a storage of the image processing apparatus.

As shown in FIG. 1, the image processing apparatus X includes an image signal source 1, a signal processing circuit 2, an input buffer memory 3, an image (frame) memory 4, an image memory control section 5, a display buffer memory 6, and a display monitor (display) 7.

The image signal source 1 is, for example, a CCD as a solid-state image pickup device of a digital camera.

From the image signal source 1, a video signal is transferred to the signal processor 2 at a transfer rate of, for example, 12.5 megaherz (MHz). The signal processor 2 conducts signal processing such as an RGB/YC conversion, and a γ correction, interpolation of color signals.

The input buffer memory 3 is, for example, a line memory in which video signals for which the signal processing has been conducted are written in the unit of one line. The image memory controller 5 writes the one-line video data of the input buffer 3 in the image memory 4. The input buffer memory 3 has two ports to simultaneously conduct data reading and writing operations.

The image memory 4 is, for example, a dynamic random access memory (DRAM) or an SDRAM. The memory 4 has a data write speed quite higher than that of the input buffer memory 3. The memory 4 conducts data write and read operations, for example, at a transfer rate of 66 MHz.

The image memory controller 5 selectively reads, for each scanning operation, image data from a video data area 10 or an OSD data area 11 of the image memory 4 shown in FIG. 2 and writes the image data in the display buffer memory 6.

In response to a display synchronizing (sync) signal, the image data is transferred from the memory 6 in the unit of one line to the display monitor (display) 7. The display 7 accordingly displays an image of the image data.

The image memory controller 5 receives an input sync signal S1, a display sync signal S3, and an OSD control signal S2. This resultantly controls data accesses between the controller 5 and the image memory 4.

As shown in FIG. 2, the image memory 4 includes a video data (first image data) area 10 and an OSD data (second image data) area 11. The video data area 10 stores one frame of video data as main image, for example, a background image on the display screen. The data area 11 stores OSD data. The OSD data is, for example, still picture data and is written in the image memory 4 in advance.

The first image data may be a mobile picture or a still picture. Similarly, the second image data may be a mobile picture or a still picture. The second image data may be a still picture for a background. That is, each of the first and second image data may be a still or mobile picture and may be a background image or a central image. Each image data can be selectively specified as above.

However, it is assumed in the system that the first image data is relatively smaller in a data quantity than the second image data.

FIG. 3 mainly shows structure of the image memory controller 5.

As shown in FIG. 3, the image memory controller 5 includes an input data write control section 12, a display data readout control section 15, and a magnification (data expansion) control section 17.

The data expansion controller 17 expands quantity of data inputted thereto and outputs the expanded data to the display buffer memory 6.

In this connection, the configuration of the controller 17 is a schematic example comprehensively associated with the magnification controller of the first embodiment and second and third embodiments respectively including bit converters.

Display data D1 from the image signal source 1 (FIG. 1) passes the signal processor 2 (FIG. 1) and the input buffer memory 3 (FIG. 1) and is fed to the image memory controller 5. Specifically, at timing synchronized with the input sync signal S11, the display data D1 is stored via the input data write controller 12 in the image memory 4.

The display data D1 includes background (first image) data D1-1 and OSD (second image) data D1-2.

The display data D1 stored in the image memory 4 is read therefrom at timing synchronized with the display sync signal S15 in a sequence of, for example, the background (first image) data D1-1 and the OSD (second image) data D1-2 and is to the display data readout controller 15.

The controller 15 receives a background/OSD change-over signal S17. The signal S17 is used to determine which one of the background data D1-1 and the OSD data D1-2 is to be fed to the magnification controller 17.

In the display data readout controller 15, the background data D1-1 or the OSD data D1-2 is selected according to the background/OSD change-over signal S17, and the selected data is transferred to the magnification controller 17.

The magnification controller 17 expands, for example, the OSD data D1-2 in response to a magnification control signal S21.

The magnification controller 17 also receives an OSD control signal S22.

The signal S22 includes an information items of a display start position at which an image of expanded OSD data D1-3 is displayed on the monitor 7 (FIG. 1) and an information item of a display size to display the image of the data D1-3.

The data D1-3 is transferred to the display buffer memory 6. The display data D1-1 and D1-3 is sent via the display buffer memory 6 to the display monitor (FIG. 1) to be actually displayed thereon. The background data D1-1 is transferred through the magnification controller 17 to the display buffer memory 6.

Description will now be given of an example of data processing of the background data D1-1 and the OSD data D1-2.

The background data D1-1 and the OSD data D1-2 (one-line data) beforehand read from the image memory 4 at timing synchronized with the display sync signal S15 are fed to the display data readout controller 15.

When the background data D1-1 is selected in response to the background/OSD change-over signal S17, the data D1-1 is fed through the magnification controller 17 to be written in the display buffer memory 6.

When the OSD data D1-2 is selected in response to the background/OSD change-over signal S17, the data D1-2 is fed to the magnification controller 17. The data D1-2 is expanded by the controller 17 into OSD data D1-3.

The OSD data D1-3 is written (over existing data), in response to an OSD control signal S22 at a location in the display buffer memory 6 corresponding to the display position. The background data and the OSD data read from the display buffer memory 6 are displayed on the monitor 7. This operation is repeatedly conducted for each scan line to resultantly display a screen image including the OSD data.

In this connection, the background data D1-1 may be expanded in the magnification controller 17. By expanding the background data D1-1, the background data D1-1 can be displayed in a zooming mode.

In the image processing apparatus, the OSD data D1-2 not expanded is transferred at least between the image memory of the OSD data and the display data readout controller 15.

Therefore, part of the data bus band used by the OSD data D1-2 between the image memory 4 and the readout controller 15 is smaller than in the case that used when the expanded OSD data D1-3 is transferred therebetween.

Next, referring to FIGS. 4 and 5, description will be given in detail of the data expansion by the magnification controller 17.

Figure 4:
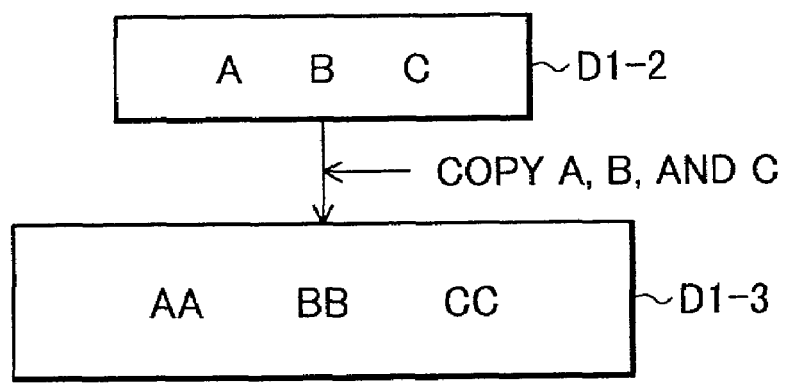
FIG. 4 is a schematic diagram showing an example of magnification of first data by a magnification controller of the image processing apparatus in the first embodiment.

FIG. 4 shows an example of a quite simple data expansion. For simplification of explanation, assume, for example, that the OSD data D1-2 includes three data items A, B, and C to be displayed at adjacent positions on the monitor 7.

In the expansion, the data amount of the OSD data D1-2 including data items A, B, and C is increased.

In an example of processing to increase the data amount, a copy operation is conducted for the original data D1-2.

By copying the data items A, B, and C, there is formed OSD data D1-3 including data items AA, BB, and CC. The data amount of the data D1-3 is twice that of the data D1-2. Without adding any complex hardware, the data amount can be doubled by a simply copy operation of the original data D1-2. Furthermore, by repeatedly conducting the copy operation, the data amount can be n times that of the original data amount, where n is an integer equal to at least three.

Since the amount of the OSD data is increased, the image thereof is also magnified on the display screen of the monitor 7.

However, the picture quality is not fully satisfactory because the OSD image is displayed according to the OSD data obtained only by the copy operation.

Figure 5:
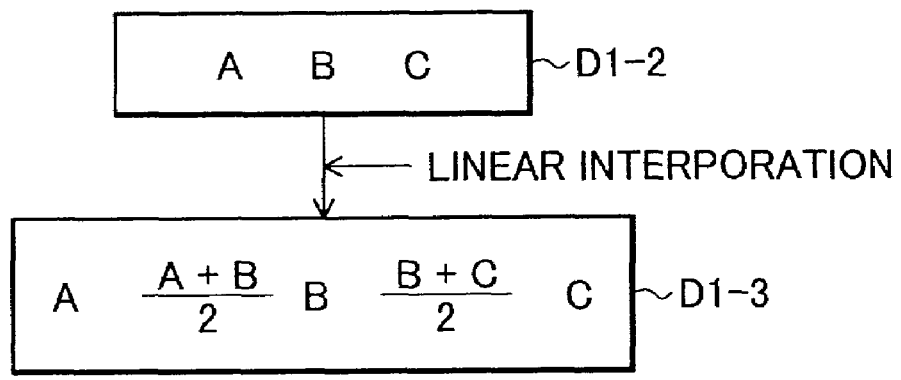
FIG. 5 is a schematic diagram showing an example of magnification of second data by a magnification controller of the image processing apparatus in the first embodiment.

Referring now to FIG. 5, description will be given of data expansion different from that of FIG. 4.

Assume, for example, that the original OSD data D1-2 includes data items A, B, and C.

For the OSD data D1-2, linear interpolation is conducted between the data items A and B and between the data items B and C. The linear interpolation between the data items A and B produces a data item (A+B)/2 and the linear interpolation between the data items B and C produces a data item (B+C)/2. The data amount of the OSD data D1-2 is increased to that of the data amount of the expanded OSD data D1-3. As a result, a magnified image of the OSD data is displayed on the monitor 7. This method requires a new module to conduct the linear interpolation between A and B and between B and C. However, thanks to the interpolation, the picture quality of the image of the data D1-3 on the monitor 7 is improved when compared with that of the image of the data D1-3 expanded only by the copy operation.

The data amount of the OSD data D1-2 transferred between the image memory 4 and the display data readout controller 15 is less than that of the OSD data D1-3 immediately before the data D1-3 is displayed on the monitor 7. The data accesses of the OSD data between the image memory 4 and the controller 15 is hence relatively reduced.

In the data expansion or magnification, it is also possible that the OSD data is beforehand minimized in a preceding stage such that the OSD data D1-2 is expanded in the magnification controller 17. Alternatively, it is possible that the OSD data is expanded in the magnification controller 17 without using the data minimization stage.

Next, description will be given of an image processing apparatus in a second embodiment.

Figure 6:
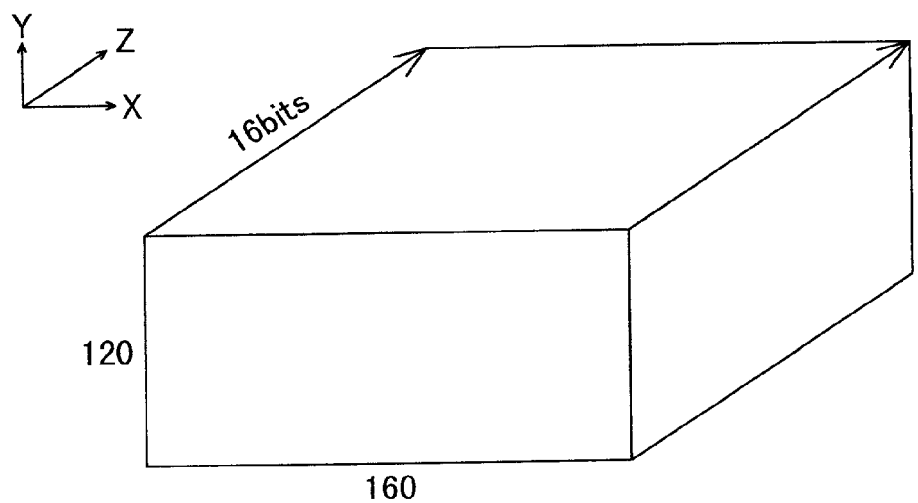
FIG. 6 is a diagram showing general structure of display data used in an image processing apparatus in a second embodiment of the present invention.
Figure 7:
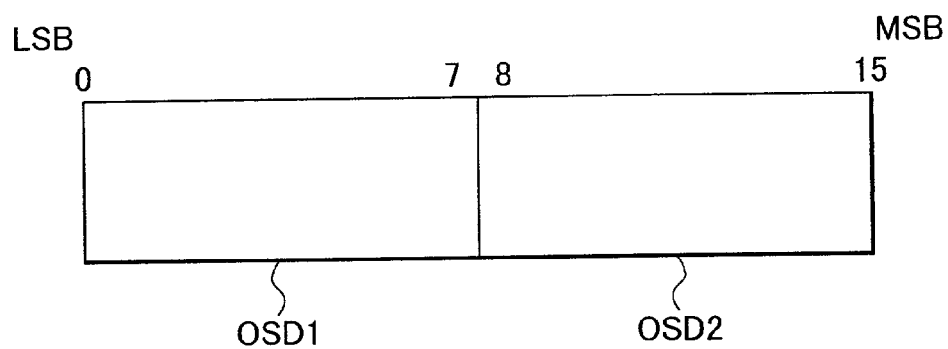
FIG. 7 is a schematic diagram showing an example of memory data allocation of pixels used in the image processing apparatus in the second embodiment of the present invention.
Figure 8:
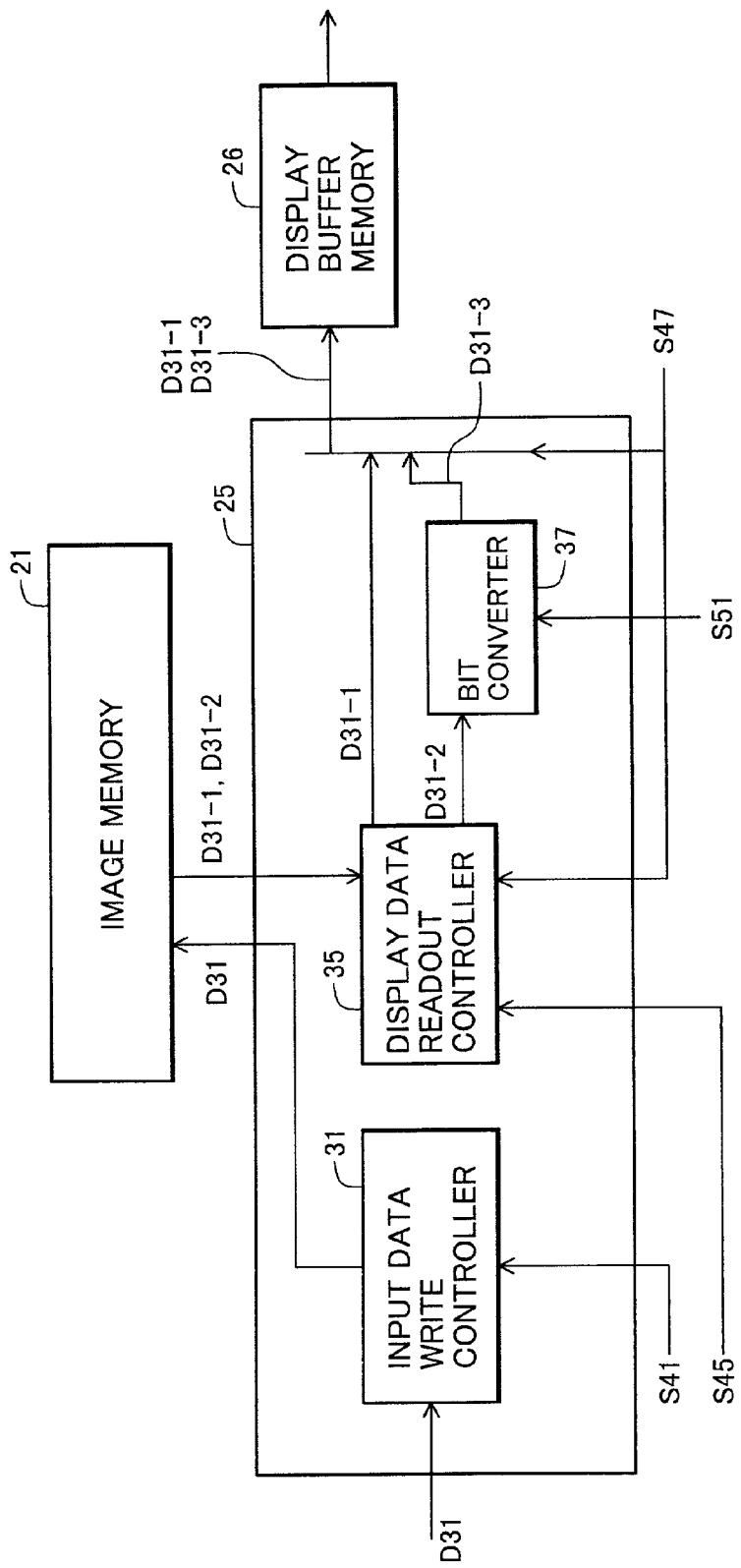
FIG. 8 is a block diagram showing constitution of an image memory controller of the image processing apparatus in the second embodiment of the present invention.

Referring to FIGS. 6 to 8, description will be given in detail of an image memory controller different from that of the image processing apparatus of the first embodiment.

FIG. 6 shows an example of a general data layout of display data.

As shown in FIG. 6, the display data is displayed in a space represented by x, y, and z axes. The display data is configured, for example, with pixels in an x by y matrix form, where x=160 pixels and y=120 pixels. Each pixel has a depth of 16 bits in a direction of the z axis (depth).

When each pixel has a depth of 16 bits, the data is sufficient as display data, for example, for general color display (with gradation, i.e., brightness and darkness).

In this connection, the OSD display data primarily includes characters and the like. Therefore, a complex change in hue or the like, which occurs in ordinary image data, rarely takes place in the OSD display data. In many cases, it is consequently not necessary that the OSD display data as color display data has a depth 16 bits. It is only necessary in many cases that the OSD display data has a depth of about eight bits (=16/2 bits).

FIG. 7 schematically shows an example of allocation of memory data for each pixel.

Ordinarily, 16 bits including bit 0 to bit 15 are assigned as memory data to one pixel. As shown in FIG. 7, the OSD display data is divided into 8-bit OSD data OSD1 ranging from the least significant bit (LSB) to the seventh bit and 8-bit OSD data OSD2 ranging from the eighth bit to the most significant bit (MSB). For example, each pixel has a data amount of eight bits on a monitor screen.

When the 16-bit data area is divided for the 8-bit OSD data OSD1 and the 8-bit OSD data OSD2, the OSD1 and the OSD2 may be allocated respectively to two pixels in one screen or to one pixel in each of two screens.

When the OSD1 and the OSD2 are allocated to one pixel in each of two screens, it is necessary to establish synchronization between the OSD1 and the OSD2 by a control circuit or the like.

FIG. 8 primarily shows the configuration of an image memory controller 25 in a block diagram. The controller 25 corresponds to the image memory controller 5 of FIG. 1.

As shown in FIG. 8, the controller 25 includes an input data write controller 31, a display data readout controller 35, and a bit converter section (data expansion controller) 37.

Display data D31 fed from the image signal source, the signal processing circuit, and the input buffer memory is stored via the input data write controller 31 in the image memory 21 at timing synchronized with an input sync signal S41.

The display data D31 stored in the image memory 21 is read therefrom at timing synchronized with a display sync signal S45 in an order of background data D31-1 and OSD data 31-2 and is fed to the display data readout controller 35.

According to a background/OSD change-over signal S47, the background data D31-1 or the OSD data 31-2 is outputted. When the display data readout controller 35 outputs the background data D31-1, the background data D31-1 is directly transferred to the display buffer memory 26, namely, the data D31-1 does not pass through the bit converter 37.

The bit converter 37 converts, for example, the 8-bit data OSD1 for one screen (FIG. 7) of the OSD data D31-2 into 16-bit OSD data 31-3.

Subsequently, in response to an OSD control signal S48 including information of a display start position and display size of the OSD image, the converted OSD data D31-3 is stored in a specified area of the display buffer memory 26.

According to the data stored in the memory, an image is actually displayed.

In this connection, the 8-bit OSD data D31-2 is converted into 16-bit data and is then transferred to the display buffer memory 26 because the display buffer memory 26 is configured, for example, only to receive 16-bit data.

Next, an example of a bit conversion method will be described.

When the display data has a data amount of 16 bits in the depth direction, the amount of information of the data is sufficient to display color information. It is therefore possible to form color display data in so-called "4-2-2 format" in which eight bits are allocated to luminance Y and the remaining eight bits are allocated to color difference C(Cb, Cr).

When the OSD data includes 8-bit data, it is only necessary, for example, that five bits are allocated to the luminance Y and three bits are allocated to the color difference C.

The bit converter 37 converts, for example, the 5-bit data of the luminance Y into 8-bit data.

For the data conversion, it is possible that three low-order bits "000" are added to the 5-bit data to form 8-bit data.

For the data conversion of 3-bit data of the color difference C into 8-bit data, it is possible that five low-order bits "00000" are added to the 3-bit data to form 8-bit data.

The bit shift in which three low-order bits "000" are added to five bits of the luminance Y is expressed as follows.

$$Y'(n)=Y(n)\times 8(2^3) \quad (1)$$

The bit shift in which five low-order bits "00000" are added to three bits of the color difference C is expressed as follows.

$$C'(n)=C(n)\times 32(2^5) \quad (2)$$

Using expressions (1) and (2), the 8-bit data can be converted into 16-bits including eight bits of Y'(n) and eight bits of C'(n).

In expressions (1) and (2), when n low-order bits of "0" are added thereto, there is obtained, for example, a general formula of $$Y'(n)=Y(n)\times 2^n.$$

In the bit conversion method, the data is processed only to the format thereof to be stored in a specified area of the display buffer memory 26. Therefore, the luminance Y actually includes 5-bit information and the color difference C actually includes 3-bit information. There exists a fear that an intermediate section of the color information is not displayed. In this situation, the intermediate section can be sufficiently display using a bit conversion method as follows.

Assume, for example, that a group of 5-bit adjacent data items Y(n) before the bit conversion is a group of step-wise changing data items "2, 2, 5, 8, 8".

When "0" is inserted to three low-order bits of each of the 5-bit data items Y(n), the 8-bit data items Y'(n) are obtained according to expression (1) as "16, 16, 40, 64, 64" in the associated sequence. Although each of the data items includes eight bits, the actual data amount of each data item is five bits. Therefore, an intermediate section is missing in the converted 8-bit data items. Like the data items before the conversion, the converted data items are obtained as a group of step-wise changing data items.

The second bit conversion method includes data interpolation processing.

This method is used the following expression for the data interpolation.

$$Y'(n)=Y(n)\times 8+\{(Y(n+1)-Y(n))+(Y(n-1)-Y(n))\}\times 4 \quad (3)$$

Assume, for example, that a group of 5-bit data items Y(n) As "2, 2, 5, 8, 8" in this sequence as in the example above.

When a bit conversion using the data interpolation of expression (3) is conducted for the data group Y(n), there is obtained an 8-bit data group Y'(n) as "16, 28, 40, 52, 64".

When compared with the bit conversion using expression (1), the bit conversion of expression (3) has an advantage that intermediate gradation can be displayed. For example, this advantageously improves continuity of each data in the adjacent data groups on the screen. However, this method requires an additional circuit to execute the processing of expression (3).

Selection of one of these methods is associated with a tradeoff between the display precision and the load of the interpolation processing. The user need only select either one thereof in consideration of the tradeoff.

The processing for the luminance Y can be similarly conducted for the color difference C.

In the image processing apparatus of the second embodiment, the bit conversion is conducted in the bit converter and the converted data is transferred to the display buffer memory. Each data item of the OSD data before the bit conversion has a data amount less than 16 bits, for example, eight bits. Therefore, the data amount which occupies the bus band of the image memory can be relatively reduced.

In the image processing apparatus of the second embodiment, two screens of data (eight bits for each screen) are allocated to the 1-pixel data area (16 bits). However, it is also possible to allocate more data, for example, data of four screens (four bits for each screen) may be allocated to the 1-pixel data area (16 bits).

Moreover, it is also possible to allocate two pixels of data (eight bits for each pixel) in one screen to the 1-pixel data area (16 bits).

The interpolation can be conducted between data items vertically adjacent to each other on the display screen (monitor). However, thee line memories are required to conduct the interpolation processing for the vertically adjacent data items, Description will now be given of an image processing apparatus in the third embodiment. The image processing apparatus of the third embodiment is basically similar to that shown in FIG. 1. Only the image memory controller varies in structure between the first and second embodiments. The image memory controller will be described in detail by referring to FIG. 9.

Figure 9:
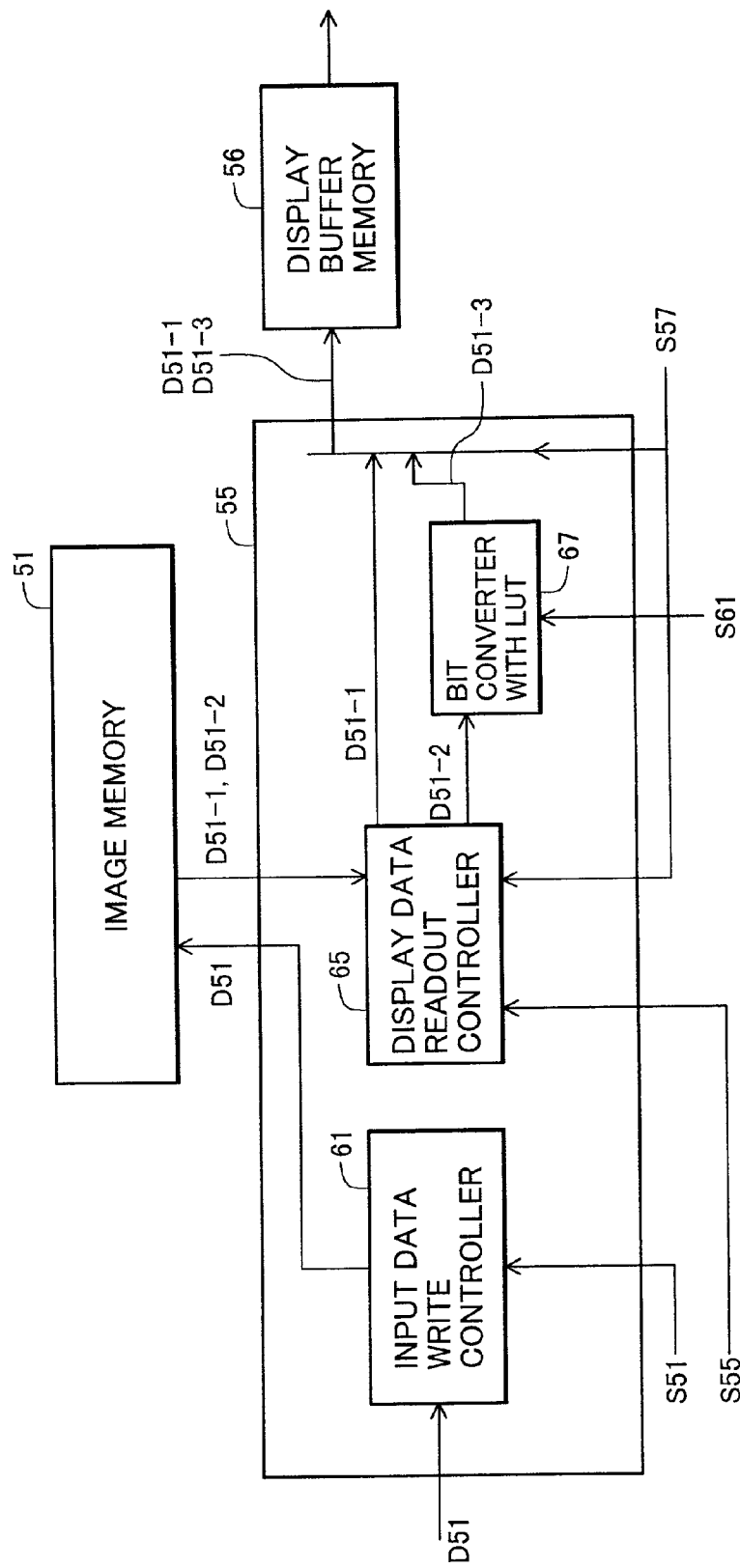
FIG. 9 is a functional block diagram showing constitution centered on an image memory controller of an image processing apparatus in a third embodiment of the present invention.
Figure 10:
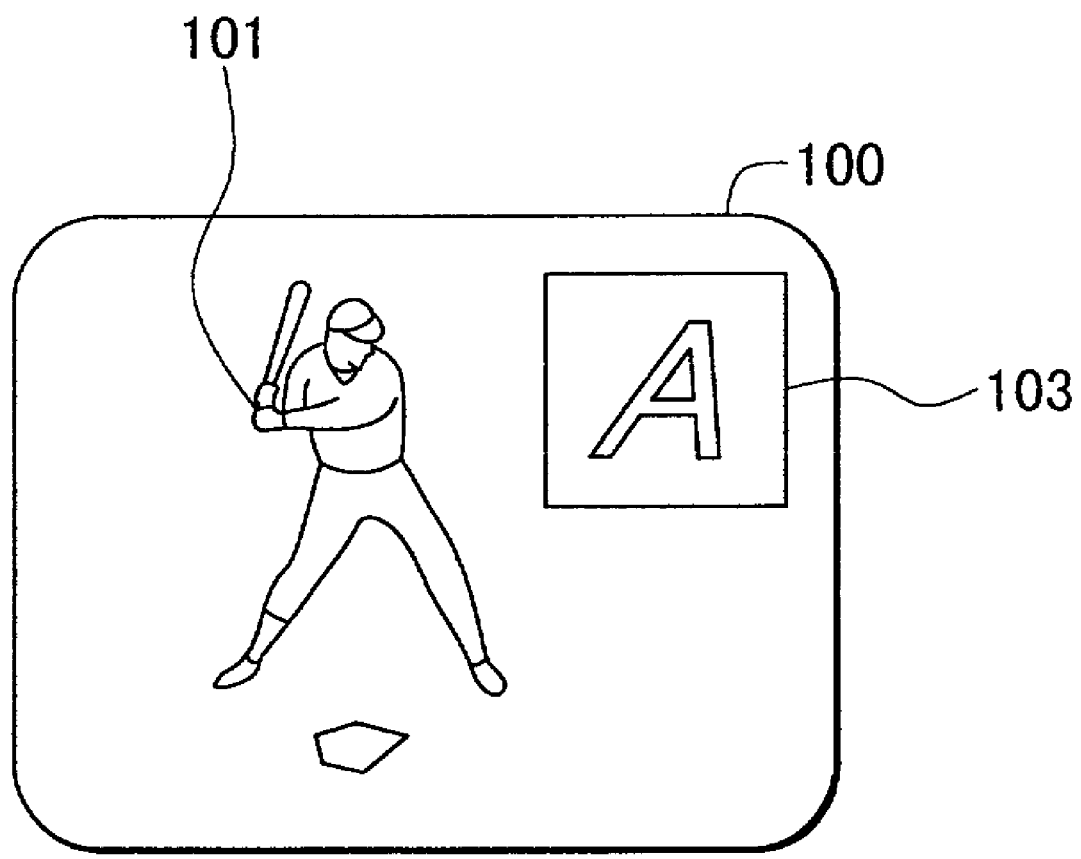
FIG. 10 is a diagram schematically showing an example of on-screen display.

FIG. 9 shows the configuration centered on an image memory controller 55 in a functional block diagram.

The image memory controller 55 includes an input data write controller 61, a display data readout controller 65, and a bit converter 67 with a lookup table (LUT). The lookup table is a table indicating, for example, a large number of addresses and color information determined for each addresses. An example of the lookup table is a color palette. By disposing a control circuit to establish synchronization, there may be disposed a table including display information other than the color information, for example, information of characters (for example, one character is represented by 16 bits by 16 bits). In place of the lookup table, there may be arranged an information table in another format, for example, to store information of character fonts such as Gothic and Mincho for the Japanese language).

The second image data includes positional information on the display screen and address information of the display information table for the color information.

The lookup table is stored, for example, in a static random access memory (SRAM) or a read only memory (ROM).

Display data D51 is fed through the image signal source, the signal processing circuit, and the input buffer memory, which are not shown, and is stored via the input data write controller 61 in a image memory 51 at timing synchronized with an input sync signal S51.

The display data D51 stored in the image memory 51 is read from the image memory 51 in an order of the background data D51-1 and the OSD data D51-2 at timing synchronized with a display sync signal S55 and is transferred to the display data readout controller 65.

More specifically, when the display data readout controller 65 selects, for example, the background data D51-1 in response to a background/OSD change-over signal S57, the data D51-1 is directly transferred to the display buffer memory 56 to be stored in a specified area thereof.

When the OSD data D51-2 is selected in response to the background/OSD change-over signal S57, the data D51-2 is transferred to the bit converter with LUT 67.

The OSD data D51-2 includes display information.

The display information is information which specifies a position (an address) of the lookup table to select either one of color data of (256) colors contained in the lookup table. The display information includes, for example, 8-bit data for each screen. For example, a one-to-one correspondence exists between each color of the 256 colors of the lookup table and the 8-bit data. When the data above is used, display information can be communicated between the image memory 51 and the display readout controller 65 using a smaller number of bits as compared with the case in which 16-bit data is used for each color of the 256 colors. When the 8-bit data is employed, two pixels or two screens of data can be kept stored in the 16-bit data structure.

Of the OSD data D51-2, the 8-bit data containing the display information (actually, positional information to specify a color in the lookup table) is converted into 16-bit actual display data, for example, color data by the bit converter with LUT 67 by referring to the lookup table. For example, 8-bit display information is converted into 16-bit color information.

The 16-bit color information obtained as a result of the bit conversion is transferred to the display buffer memory 56 in response to an OSD control signal including information of a display start position and a display size of the OSD image. Of the OSD data D51-3, data regarding the 16-bit color information and data regarding the positional information on the display are stored in a specified area of the display buffer memory 56. An image is actually displayed according to the information thus stored.

In the image processing apparatus, when 8 bits of color information is assigned for each pixel, $2^8=256$ colors can be displayed by referring to the lookup table in the bit converter.

Displayable colors are determined according to data in the lookup table. Therefore, with a small amount of data before the bit conversion, desired colors can be selected from many colors for the display thereof.

When an SDRAM or an electrically erasable ROM ($E^2$ROM) is employed as the lookup data, all or part of color information data stored, for example, in the lookup table can be modified. When it is desired, for example, to change an overall hue, the data of the lookup table need only be replaced with data including color information for the desired hue.

In the image processing apparatus of the third embodiment, the data amount of color information data before the bit conversion can be minimized. Therefore, only a relatively small amount of data occupies the bus band of the image memory.

By combining the configuration of the first embodiment and the schemes of the second and third embodiments with each other, the OSD data accesses between the image controller and the image memory can be reduced.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

The invention claimed is:

1. An image processing apparatus, comprising:
   an image memory including a first memory area to store a first image data group of a first image for a background and a second memory area for storing a second image data group of a second image for an on-screen display;
   a display buffer memory for storing the first image and the second image read from said image memory, in a format to be displayed on a display screen; and
   a control section for controlling accesses in said image memory and said display buffer memory, for reading the first image data group from the first memory area and writing the first image data group in said display buffer memory without intervening with any other memory area or buffer memory, and for reading the second image data group from the second memory area and writing the second image data group in a specified area of said display buffer memory, wherein
   said control section includes a data expansion control section capable of selectively increasing a data amount of only the second image data group read from said image memory, according to the second image data group, and of outputting the data amount to the display buffer memory.

2. An image processing apparatus according to claim 1, wherein said data expansion control section includes a magnification control section for magnifying the second image data group.

3. An image processing apparatus according to claim 2, wherein said magnification control section includes a circuit for adding a new data group obtained by copying each data contained in the second image data group to the second image data group.

4. An image processing apparatus according to claim 3, wherein said magnification control section includes a circuit for also magnifying the first image data group.

5. An image processing apparatus according to claim 2, wherein said magnification control section includes a circuit for adding a new data group obtained by conducting a linear interpolation for the second image data group to the second image data group.

6. An image processing apparatus according to claim 5, wherein said magnification control section includes a circuit for also magnifying the first image data group.

7. An image processing apparatus according to claim 2, wherein said display buffer memory stores the magnified second image data group.

8. An image processing apparatus according to claim 7, wherein said magnification control section includes a circuit for also magnifying the first image data group.

9. An image processing apparatus according to claim 2, wherein said magnification control section includes a circuit for also magnifying the first image data group.

10. An image processing apparatus according to claim 1, wherein said data expansion control section includes a bit converter section for conducting a bit conversion to increases a number of bits of the second image data group.

11. An image processing apparatus according to claim 10, wherein said bit converter section executes processing to add data "0" to low-order bits of the second image data group until a number of bits of data resultant from the bit addition reaches a number of bits which can be stored in said display buffer memory.

12. An image processing apparatus according to claim 10, wherein said bit converter section executes:
   first processing to add data "0" to low-order bits of the second image data group until a number of bits of data resultant from the bit addition reaches a number of bits which can be stored in said display buffer memory; and
   second processing of smoothing processing to substantially equalize difference between data obtained from the first processing, the data being adjacent to each other on a display screen.

13. An image processing apparatus according to claim 10, wherein:
   said bit converter section includes a display information table containing a large number of display information items and address information items indicating addresses at which the display information items are respectively stored; and
   the second image data group includes a display position specifying information to specify a display position on the display screen and the address information.

14. An image processing apparatus according to claim 13, wherein said display information table is rewritable.

15. An image processing apparatus according to claim 14, wherein said display information items are information items regarding colors to be displayed on the display screen.

16. An image processing apparatus according to claim 13, wherein said display information items are information items regarding colors to be displayed on the display screen.

17. An image processing method, comprising the steps of:
   (a) storing, in an image memory, a first image data group for a background and a second image data group for an on-screen display;
   (b) reading the first image data group for a background and the second image data group for an on-screen display from the image memory, writing the first image group in a display buffer memory without intervening with any other memory area, selectively increasing a data amount of only the second image data group, and outputting the data amount to the display buffer memory; and
   (c) displaying, on a display screen, the first image data group and a second image data group of which the data amount is increased.

18. An image processing method according to claim 17, wherein said step (b) comprises the step of copying each data of the second image data group to obtain a new data group and adding the new data group to the second image data group.

19. An image processing method according to claim 17, wherein said step (b) comprises the step of conducting a linear interpolation for the second image data group to obtain a new data group and adding the new data group to the second image data group.

* * * * *